L. FAUQUÉ.
RAIL FASTENING DEVICE.
APPLICATION FILED DEC. 22, 1911.

1,053,979.

Patented Feb. 25, 1913.

Witnesses
Julius Cazaux
Joseph Coupaud

Inventor
Léon Fauqué

UNITED STATES PATENT OFFICE.

LÉON FAUQUÉ, OF PARIS, FRANCE.

RAIL-FASTENING DEVICE.

1,053,979.  Specification of Letters Patent.  Patented Feb. 25, 1913.

Application filed December 22, 1911. Serial No. 667,287.

*To all whom it may concern:*

Be it known that I, LÉON FAUQUÉ, a citizen of the French Republic, residing at 16 Place de la République, Paris, France, with post-office address care of J. P. Bonnicart & Cie., 16 Place de la République, Paris, France, have invented new and useful Improvements in Rail-Fastening Devices, of which the following is a specification.

My invention relates to improvements in rail fastening devices in which a metallic fastening bolt is eccentrically hollowed out at its upper part, and innerly screw-threaded, so as to receive a fastening screw, said bolt having an open slot which is horizontal, transversal and rectangular and in which the foot of the rail is held.

Figure 1:
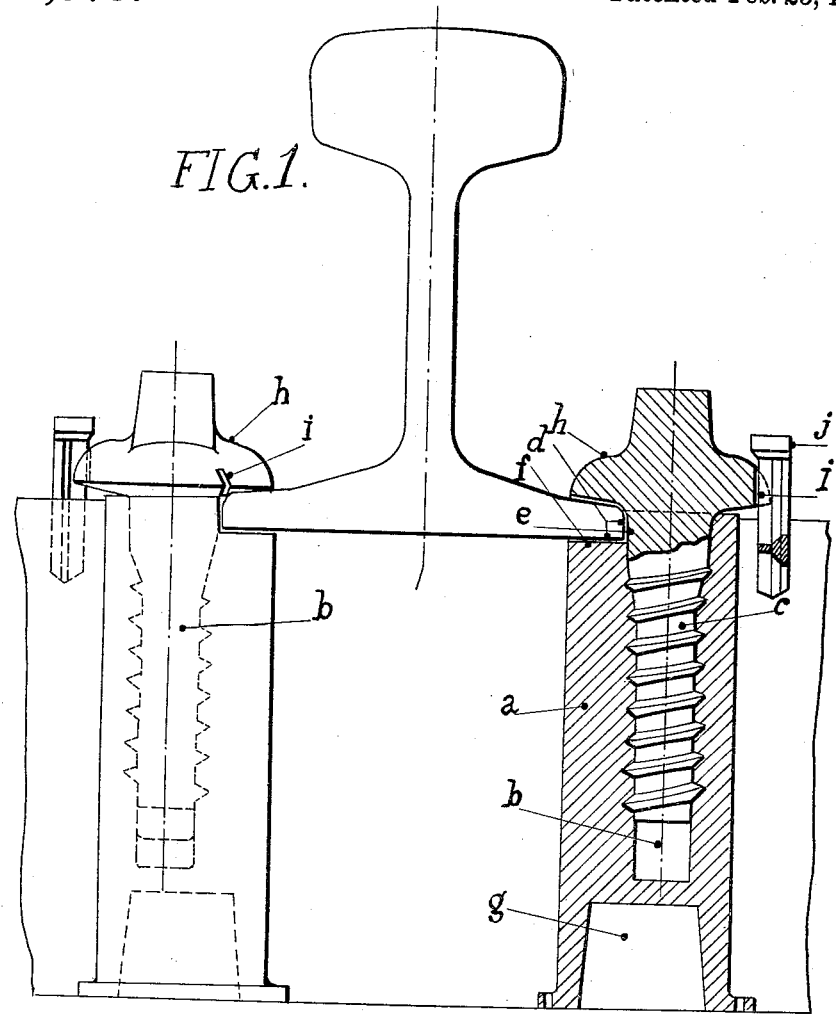
Figure 2:
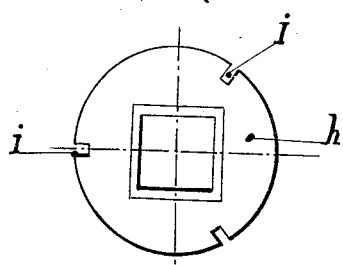
Figure 3:
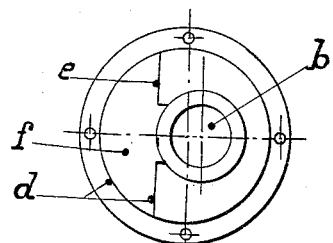

The object of my invention is to provide safe and unchangeable fastening of railway rails on their sleepers. I attain these objects by the mechanism illustrated in the accompanying drawing in which:

Figure 1 is a diagrammatical section of the device showing a rail fastened to its sleeper. Figs. 2 and 3 are top views of the bolt and fastening screw.

As represented in the drawing, the fastening device comprises a metallic cylindrical bolt $a$ of flat external surface, which is placed by pressure in a corresponding hole of the sleeper. Said bolt has at its upper part, a longitudinal screw threaded hole $b$ which is eccentrical relatively to the axis of the bolt, in which threaded hole the rail fastening screw $c$ is intended to be screwed.

The upper extremity of the bolt has an appropriate rectangular slot $d$ in which the vertical wall $e$ applies against the foot of the rail thus constituting a shoulder, and the horizontal surface $f$ supporting the said foot of the rail, prevents its sinking in the sleeper. At its lower extremity the bolt has a square recess $g$ which facilitates the positioning of the bolt in the hole of the sleeper where it is placed by pressure and by turning on its axis. The screw $c$ of ordinary shape as are generally coach screws in use for railway purposes, bears on its periphery $h$ recesses $i$ (Fig. 2) one of which engages with stopping part $j$ fitted in the sleeper so as to maintain the screw steady. These three parts: the bolt $a$, the screw $c$, and the stop $j$, constitute a fastening device of which the following are the main advantages: the metallic cylindrical bolt fixed in the wooden sleeper by strong pressure, is absolutely undetachable from said sleeper and thus form together only one body. Besides the surfaces $e$, $f$, of the slot and the head of the screw constitute a metallic chamber of which the supporting surfaces are sufficient to support any load; the screw being held steady by its recess $i$ and stop $j$ will not unscrew, the said metallic chamber will therefore join tightly and the foot of the rail be retained in an absolute safe manner, thus the rail will not bend under heavy load and rise again afterward, as in such case the shaking injures the fixing material and the rail cuts in the wooden sleeper after a certain period of use, the excess of elasticity in the fastening system causes in many instances the screw to become unscrewed.

The rail fixing device according to the present invention will resist the effects of any widening of the gage or canting of the rail.

The supporting saddles or beddings placed under the rail may thus be discarded and replaced by four fasteners for each sleeper which would be sufficient even for curves. By the said means the movements of the rails on their sleepers will be avoided.

The rigidity given to the system by the metallic bolt enables the use of sleepers made of common and cheap wood, finally the fixing point or stop $j$, held not in the bolt but in the sleeper, this being facilitated by the eccentric arrangement of the screw, makes the three parts independent one from the other and consequently not subject to the effects of shocks.

The longitudinal hole $b$ which is to receive the screw $c$ ends at the bottom with a chamber which may be used as a reservoir containing any rust proof product such as oil or tar in order to prevent the oxidation of the screw $c$.

I am aware that rail fastening devices are existing which comprise a wooden socket of external cylindrical shape and which are placed by pressure in a hole of the wooden sleeper, and on the upper extremity of which, a coach screw or other fastening screw is placed, of which the head or knob applies on the foot of the rail, I am also aware that another method has been tried which consists in placing the foot of the rail on a part of the upper extremity of the said wooden socket; but those systems are not suitable for the following reasons: It is impossible to secure sufficient tightness between the wood of the socket and the sleeper in order to make them support the axial efforts developed during use, besides, the foot of the rail being supported by wooden parts and partially by the sleeper itself, it is hardly possible to avoid the shaking of the rail which loosens the system and finally pulls out the coach screws.

My invention enables one to obviate the above difficulties; first by fastening together the socket with the sleeper and second by placing the foot of the rail in a chamber which is entirely metallic, and of which the walls are solid enough to alone support the efforts of the load transmitted by the rail, as explained above.

I claim:

1. A device for fastening railway rails to sleepers, comprising a bolt adapted to be inserted in a railway sleeper and provided with a threaded recess eccentrically disposed with respect to the longitudinal axis of said bolt and having a shoulder formed at the top and at one side of said recess for supporting the foot of a rail, a fastening screw adapted to enter said recess and having a head for holding the rail fast on said shoulder.

2. A device for fastening railway rails to sleepers, comprising a bolt adapted to be inserted in a railway sleeper, and provided with a recess, the upper part of which is threaded and eccentrically disposed with respect to the longitudinal axis of said bolt, a shoulder at the top and at one side of said recess for supporting the foot of a rail, a fastening screw adapted to enter said threaded portion of the recess and provided with a head for holding the rail fast in said shoulder, the bottom of the recess being adapted to contain a rust proof material for said screw.

3. A device for fastening railway rails to sleepers, comprising a bolt adapted to be inserted in a railway sleeper, and provided with a recess the upper part of which is threaded and eccentrically disposed with respect to the longitudinal axis of said bolt, a shoulder at the top and at one side of said recess for supporting the foot of a rail, a fastening screw adapted to enter said threaded portion of the recess and provided with a head for holding the rail fast in said shoulder, the bottom of the recess being adapted to contain a rust proof material for said screw, said bolt having a key socket in its lower end for the purpose described.

In witness whereof I have hereunto set my hand in presence of two witnesses.

LÉON FAUQUÉ.

Witnesses:
  JOSEPH COUPARD,
  H. C. COXE.

---

Copies of this patent may be obtained for five cents each, by addressing the "Commissioner of Patents, Washington, D. C."